United States Patent [19]

Shaver et al.

[11] Patent Number: 5,446,769
[45] Date of Patent: Aug. 29, 1995

[54] METHOD FOR PROVIDING HAND-OFFS IN A FREQUENCY HOPPING COMMUNICATION SYSTEM

[75] Inventors: John Shaver, Glen Ellyn; Michael P. Nolan, Lake Zurich; Charles D. Macenski, Arlington Heights; Alan D. Muehlfeld, Mount Prospect; Brian Wesselman, Arlington Heights, all of Ill.

[73] Assignee: Motorola, Inc., Schaumburg, Ill.

[21] Appl. No.: 205,461

[22] Filed: Mar. 4, 1994

[51] Int. Cl.6 .................................. H04B 1/713
[52] U.S. Cl. ...................................... 375/202
[58] Field of Search ............................... 375/1

[56] References Cited

U.S. PATENT DOCUMENTS

| | | | |
|---|---|---|---|
| 4,558,453 | 12/1985 | Mimken | 375/1 |
| 4,677,617 | 6/1987 | O'Connor et al. | 375/1 |
| 4,688,251 | 8/1987 | Citron et al. | 375/1 |
| 4,807,248 | 2/1989 | Pyatt et al. | 375/1 |
| 5,081,641 | 1/1992 | Kotzin et al. | 375/1 |
| 5,121,408 | 6/1992 | Cai et al. | 375/1 |
| 5,130,987 | 7/1992 | Flammer | 375/1 |
| 5,394,433 | 2/1995 | Bantz et al. | 375/1 |

Primary Examiner—Salvatore Cangialosi
Attorney, Agent, or Firm—Val Jean F. Hillman

[57] ABSTRACT

A method for handing off user devices (131-134) between network control processors (110, 120) in a frequency hopping communication system (100) includes establishing a set of synchronization frequencies (A-D) for use by said NCPs (110, 120), informing the plurality of user devices (131-134) of said synchronization frequencies (A-D) and assigning a synchronization frequency (A, B, C or D) to each respective NCP, each NCP transmitting synchronization information at its assigned synchronization frequency (A, B, C or D) during each hopping dwell (1-82). Upon a determination that a user device hand-off is necessary, said user device in question (133) tunes to a synchronization frequency (B) different from the synchronization frequency (A) employed by the currently serving NCP (110) and synchronizes its operation to the NCP (120) transmitting synchronization information on the tuned to synchronization frequency (B).

12 Claims, 1 Drawing Sheet

FIG.1
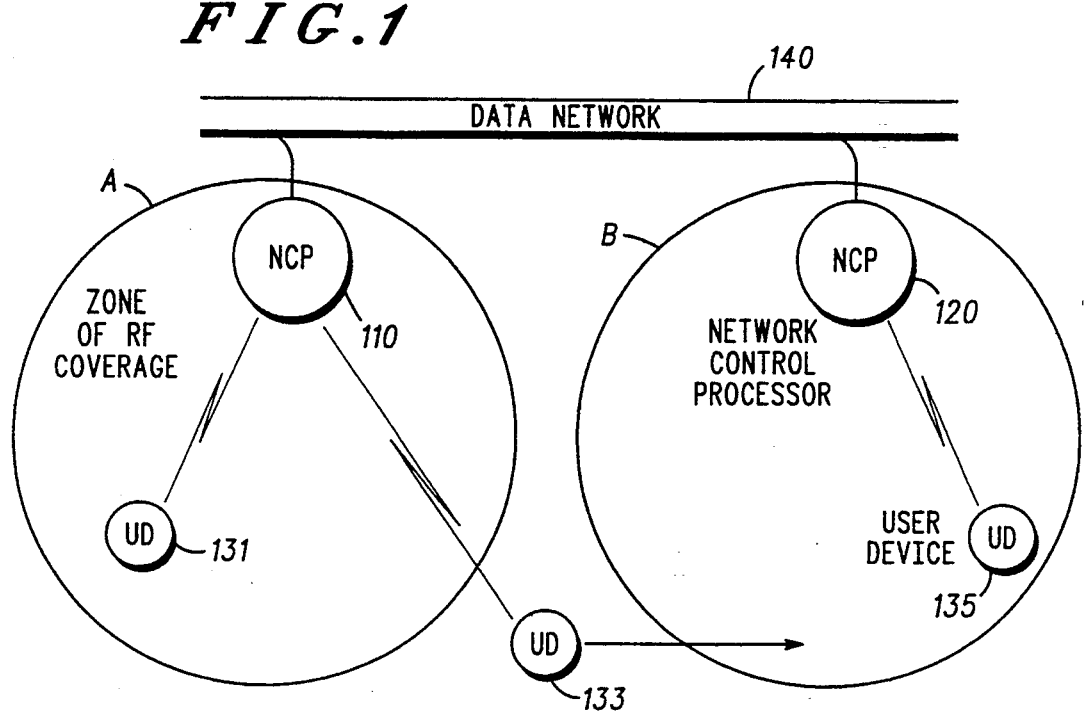
FIG.2
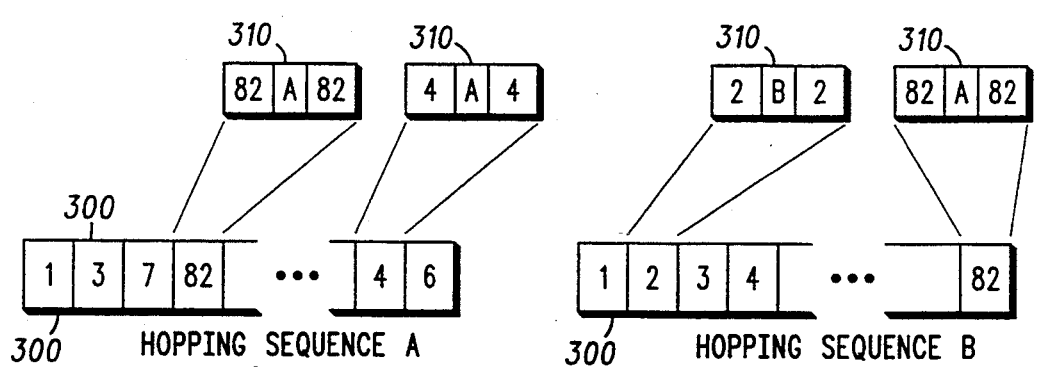
FIG.3

METHOD FOR PROVIDING HAND-OFFS IN A FREQUENCY HOPPING COMMUNICATION SYSTEM

TECHNICAL FIELD

This invention relates generally to radio communication systems and particularly to a method for providing hand-offs in a frequency hopping spread spectrum radio communication system.

BACKGROUND OF THE INVENTION

Frequency hopping (FH) is a well known spread spectrum technique. As will be appreciated, frequency hopping can be used as a multiple access technique, in order to share a communications resource among numerous user groups. Since a user group typically employs a unique spread-spectrum signaling code, (e.g., frequency hopping set) privacy between individual user groups is easily established. Moreover, radio interference, such as, but not limited to co-channel interference, adjacent channel interference and Raleigh fading is greatly reduced.

Unfortunately, when a user group member seeks or requires access to a user group employing a different spread-spectrum signaling code, such as during a hand-off between network control processors (NCPs) of the frequency hopping communication system, acquisition and synchronization becomes a formidable challenge. This is due in part to the fact that each NCP has a different frequency hopping set.

It would be extremely advantageous therefore to provide a method for the fast acquisition of and synchronization to a foreign frequency hopping set in a frequency hopping communication system.

SUMMARY OF THE INVENTION

Briefly described, the present invention is a method for handing off user devices between network control processors (NCPs) in a frequency hopping communication system wherein NCPs communicate with said user devices by transmitting respective traffic channel information over a sequence of frequencies known as a hopping set, for a period of time on each frequency, said period being known as a dwell. As will be appreciated, each NCP has a different hopping set thereby making user device hand-off and synchronization a formidable challenge. This challenge is met by establishing a set of synchronization frequencies for use by said NCPs, informing the plurality of user devices of said synchronization frequencies, and assigning a synchronization frequency from the set to each respective NCP. Each NCP thereafter operates to transmit synchronization information at an assigned synchronization frequency during each dwell. Upon a determination that a user device hand-off is necessary, said user device will tune to a synchronization frequency different from the synchronization frequency employed by the currently serving NCP and synchronizes its operation to the NCP transmitting synchronization information on the tuned to synchronization frequency.

BRIEF DESCRIPTION OF THE DRAWINGS

FIG. 1 is a diagram of a frequency hopping communication system anticipated by the present invention;

FIG. 2 is a block diagram of a memory table employed by the user devices shown in FIG. 1; and FIG. 3 is a diagram of a hopping sequence employed by the communication system of FIG. 1.

DETAILED DESCRIPTION OF A PREFERRED EMBODIMENT

In the preferred embodiment, the invention describes a method of quickly handing off a User Device (UD) between Network Control Processors (NCP) in a frequency hopping communication system. In such an environment, NCP's and UD's must be synchronized such that the NCP and UD communicate on the same frequency at the same time. In order to avoid the deleterious effects of radio interference, a number of hopping sets are established which define the order of the available frequencies that an NCP will communicate on. By establishing several different possible hopping sets and assigning a single hopping set to a respective NCP, the NCP's may be located in closer proximity without interference to one another. Notwithstanding, it is the responsibility of the UD to select and join in the hopping set of a particular NCP.

FIG. 1 is a diagram of a frequency hopping communication system anticipated by the present invention. In reference to FIG. 1, UD 133 is currently communicating with NCP 110 and is employing the same hopping set as NCP 110 (hopping sequence A as shown in FIG. 3). As the UD 133 moves outside the zone of RF coverage provided by NCP 110, UD 133 must find and synchronize to another NCP. In order to perform this function, the present invention suggests establishing a set of synchronization frequencies for use by the plurality NCPs to transmit synchronization information and assigning a single synchronization frequency from the set of available synchronization frequencies to each respective NCP.

As will be appreciated all user devices operating within the system must be informed of and capable of monitoring each available synchronization frequency.

As an NCP hops through its respective hopping set, it will transmit synchronization information at the assigned synchronization frequency during a portion of each hop (i.e., dwell).

When UD 133 loses all communication with NCP 110 or determines a sufficient bit error rate (BER) has occurred or when by some other method a decision that a device hand-off is required (e.g., measuring received signal strength (RSSI) or signal quality or channel capacity load, the UD 133 will tune to one of the reserved synchronization frequencies employed by an NCP other than NCP 110 which is currently servicing UD 133.

Referring back to FIG. 1, once UD 133 has tuned to the synchronization frequency employed by, for example, NCP 120, it will receive transmitted synchronization information and attempt to synchronize its operation to the hopping set employed by NCP 120.

In accordance with the present invention, synchronization information may include, but is not limited to a current hopping set sequence identifier, a current hopping frequency and a location within the current dwell. As will be appreciated, this information permits UD 133 to quickly synchronize its operation to that of NCP 120 by providing UD 133 the current sequence order, the current frequency of transmission and a location of the synchronization information within the current dwell. Since the synchronization information appearing within each dwell is of a fixed duration and since each dwell is likewise of a fixed duration, the location of the synchronization information within the dwell operates to identify to UD 133 a remaining time period within the current dwell before a change to the [next sequence and] frequency is required. (See FIG. 3).

Armed with this information UD 133 performs synchronization by changing the previous hopping set sequence and frequency associated with NCP 110 to the sequence and frequency identified in the synchronization information of NCP 120. Knowledge of where NCP 120 is in the current dwell, permits the device to determine when to hop to the next frequency in the current hop set sequence.

Where there are a plurality of NCPs available for UD 133 to hand off to, UD 133 will tune to the synchronization frequencies employed by the respective NCPs, receive transmitted synchronization information from each, select the NCP providing the best available communications and synchronize itself to the hopping set sequence employed by the selected NCP. Much as before, this selection may be based in part upon measurements of channel capacity load (i.e., number of users currently registered), RSSI, BER, or some other measure of signal quality.

FIG. 2 is a block diagram of a memory table employed by the user devices of FIG. 1. This memory table, which resides in all UD's within the system, specifies the set of reserved synchronization frequencies employed by the plurality of NCPs and which require monitoring by the UDs during a handoff. Because the memory table comprises a finite set of frequencies that do not appear in the hopping set sequences employed by an NCP and because each NCP has assigned only a single synchronization frequency (e.g. A, B, C, D), fast acquisition and synchronization is facilitated by monitoring this small set of synchronization signals.

FIG. 3 is a diagram of the hopping sequence employed by NCP 110 and NCP 120 of the communication system of FIG. 1. In the illustrated example, hopping sequence A is employed by NCP 110 while hopping sequence B is employed by NCP 120. Each dwell 300 of respective hopping sequences A or B has disposed therein a period of time for transmission of synchronization information 310. As previously stated, the synchronization information field 310 may comprise the current hopping set sequence, the current frequency of operation, and the location within the current dwell of the synchronization information. While depicted in the center portion of each dwell 300, it will be appreciated by those skilled in the art that the positioning or location of the synchronization information portion of a dwell may be dynamically selected by the respective NCP. Thus it may appear at the beginning, the end or anywhere there between.

What is claimed is:

1. In a frequency hopping communication system wherein network control processors (NCPs) communicate with user devices by transmitting traffic channel information at each respective frequency within a plurality of frequencies, known as a hopping set, and for a period of time at each respective frequency, known as a dwell, each NCP having a different hopping set, a method for handing off user devices between NCPs comprising the steps of:
   establishing a set of synchronization frequencies for use by said NCPs;
   informing the plurality of user devices of said synchronization frequencies;
   assigning a single synchronization frequency from the set of synchronization frequencies to each respective NCP;
   each NCP transmitting synchronization information at the assigned synchronization frequency during a portion of each dwell;
   upon a determination that a user device handoff is necessary;
   said user device tuning to the synchronization frequency employed by a different NCP and receiving transmitted synchronization information; and
   said user device synchronizing its operation to the hopping set employed by the different NCP.

2. The method of claim 1 wherein said synchronization information comprises a hopping set sequence, a current hopping frequency and a location within the current dwell.

3. The method of claim 2 wherein the location within the current dwell identifies the location of the synchronization information.

4. The method of claim 2 wherein the location within the current dwell identifies a remaining time period within the current dwell.

5. The method of claim 1 wherein said step of transmitting synchronization information during a portion of each dwell further comprises the step of:
   the NCP dynamically selecting that portion of each dwell having the synchronization information for transmission.

6. The method of claim 1 further comprising the step of a user device determining when a hand-off is necessary.

7. The method of claim 1 further comprising the step of an NCP determining when a hand-off is necessary.

8. The method of claim 1 wherein the determination that a user device hand-off is necessary is based upon measuring at least one of: bit error rate, received signal strength or received signal quality.

9. The method of claim 1 wherein said step of synchronizing further comprises the steps of:
   changing the hopping set to the current hopping set sequence identified in the received synchronization information;
   changing the hopping frequency to the current hopping frequency identified in the received synchronization information; and
   determining when to hop to a next frequency in the current hopping set sequence based upon knowledge of the synchronization information's location within the current dwell.

10. The method of claim 9 further comprising the step of determining when to hop to a next frequency in the current hopping set sequence based upon knowledge of a remaining time period within the current dwell.

11. The method of claim 1 further comprising the steps of:
   upon a determination that a user device handoff is necessary;
   said user device tuning to a plurality of synchronization frequencies employed by different NCPs and receiving transmitted synchronization signals thereon;
   selecting an NCP as a function of the received synchronization signals; and
   said user device synchronizing its operation to the hopping set employed by the selected NCP.

12. The method of claim 11 wherein NCP selection is based upon measuring at least one of: bit error rate, received signal strength, received signal quality or channel capacity load.

* * * * *